US009800410B1

(12) United States Patent
Clayton et al.

(10) Patent No.: US 9,800,410 B1
(45) Date of Patent: *Oct. 24, 2017

(54) DATA ENCRYPTION SYSTEM AND METHOD

(71) Applicant: Key Holdings, LLC, Huntsville, AL (US)

(72) Inventors: Ray Clayton, Huntsville, AL (US); Ronn W. Cochran, Huntsville, AL (US)

(73) Assignee: Key Holdings, LLC, Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/747,915

(22) Filed: Jun. 23, 2015

Related U.S. Application Data

(63) Continuation-in-part of application No. 14/203,309, filed on Mar. 10, 2014, now Pat. No. 9,065,636, which is a continuation of application No. 11/838,652, filed on Aug. 14, 2007, now Pat. No. 8,670,564.

(60) Provisional application No. 60/837,478, filed on Aug. 14, 2006.

(51) Int. Cl.
*H04L 9/00* (2006.01)
*H04L 9/08* (2006.01)

(52) U.S. Cl.
CPC ................... *H04L 9/0869* (2013.01)

(58) Field of Classification Search
CPC ..... H04L 9/22; H04L 9/18; H04L 9/26; H04L 9/08; G06F 7/582

USPC ........................ 380/28–30, 44–47, 277–286; 713/150–154, 160–167, 189–193
See application file for complete search history.

(56) References Cited

U.S. PATENT DOCUMENTS

| | | | | |
|---|---|---|---|---|
| 8,443,020 B2 * | 5/2013 | Matsui | .................... | G06F 7/582 380/46 |
| 2005/0036610 A1 * | 2/2005 | Krell | ....................... | G06F 7/582 380/44 |

* cited by examiner

*Primary Examiner* — Evans Desrosiers
(74) *Attorney, Agent, or Firm* — Stephen H. Hall; Bradley Arant Boult Cummings LLP

(57) ABSTRACT

An improved method for data encryption has been developed. The method includes storing data, multiple prime numbers and random numbers within an electronic memory storage device. Next, calculating a public number using the multiple prime numbers and providing a public number to a recipient apparatus that has knowledge of the multiple prime numbers. The method then encrypts the stored data with a randomly generated key that is determined with elliptical curve cryptography (ECC) and deletes the randomly generated key after use. Next, the method calculates a common shared secret between the sender and recipient using the prime numbers, a recipient public number and the second random number. The sender and recipient calculate parameters using a key equation based on the randomly generated key and random numbers and a common shared secret. Finally, the recipient calculates the randomly generated key for decryption using the common shared secret, one of the prime numbers, the parameters and the simultaneous equations for decryption of the data.

4 Claims, 4 Drawing Sheets

DATA ENCRYPTION SYSTEM AND METHOD

CROSS-REFERENCE TO RELATED APPLICATIONS

This application is a continuation-in-part application of U.S. patent application Ser. No. 14/203,309 entitled "Improved Data Encryption System and Method" and filed on Mar. 10, 2014, which claims priority to U.S. patent application Ser. No. 11/838,652, now U.S. Pat. No. 8,670,564, entitled "Data Encryption System and Method," and filed on Aug. 14, 2007, which claims priority to U.S. Provisional Patent Application No. 60/837,478, entitled "Data Encryption System and Method," and filed on Aug. 14, 2006, both of which are incorporated herein by reference.

FIELD OF THE INVENTION

The invention relates generally to data encryption systems and methods.

BACKGROUND ART

Various types of data encryption systems exist for protecting data from unauthorized users. As an example, in data encryption standard (DES) encryption, a key is shared between a sender and a recipient. This key is referred to as a "shared secret" in that it is "shared" between the sender and recipient but is kept "secret" with respect to unfrosted users. The sender uses the key to encrypt data before sending it to the recipient, and the recipient, upon receiving the encrypted data, uses the key to decrypt the encrypted data. If an unauthorized user, sometimes referred to as a "hacker," gains access to the encrypted data, it is very difficult for such a user to extract any useful information from the data without the key.

In pretty good privacy (PGP) encryption, data is similarly encrypted between a sender and a recipient. However, the sender and recipient each have a pair of keys, a private key and a public key. The public keys are exchanged between the sender and the recipient. These keys are "public" in the sense that they may be shared with untrusted users without compromising the security provided by the encryption. —Each private key, however, is a "private secret." In this regard, a private key is a "secret" in that it is not shared with untrusted users, and it is "private" in that it is not shared between the sender and the recipient. Ideally, only the sender is aware of his private key, and only the recipient is aware of his private key.

When sending data via PGP encryption, the sender randomly generates a session key and uses this session key to encrypt the data. The sender then encrypts the session key using the recipient's public key and transmits the encrypted data 'and the encrypted session key to the recipient. The recipient then uses his public key to decrypt the session key so that the session key can be used to decrypt the data. Although the public keys may be shared and known by others, it is important for each user to keep his or her private key secret since a private key can be used to decrypt the session key and, therefore, to ultimately decrypt the encrypted data.

There are various other key sharing encryption schemes that can be used to protect data being communicated between a sender and a recipient. However, a vulnerability of many of these encryption schemes is that secret keys used for encrypting and/or decrypting data are typically stored on a computer by the sender and/or recipient. Thus, it is possible for a hacker to employ known hacking techniques to access the data stored on such a computer and to thereby discover a secret key. The hacker may then use the key to extract useful information from encrypted data. Indeed, in order to recover a message defined by encrypted data, it is often much easier for a hacker to recover the message by finding the key that is needed to decrypt the data than it is for the hacker to break the encryption scheme.

Due to the vulnerability associated with hackers gaining access to secret keys, users are often encouraged to periodically obtain new encryption keys so that at least future messages can be protected from a hacker that has discovered a previously used key. However, periodically obtaining new encryption keys can be burdensome. Further, although a new encryption key can prevent a hacker from extracting useful information from future messages, obtaining a new encryption key does little to protect data that has been previously compromised due to a hacker finding a previously used key. Preventing a hacker from finding secret keys in the first place is a much more preferable solution.

Indeed, improvements to data security products, such as firewalls, hate been developed in an effort to prevent hackers from gaining access to sensitive data, such as secret keys, residing on user computers. However, hackers have shown an ability to develop new techniques to defeat improvements to these data security products and access information residing on user computers.

Moreover, better encryption techniques are generally desirable to enhance data security and reduce the likelihood that an unauthorized useful can extract useful information from encrypted messages.

SUMMARY OF THE INVENTION

In some aspects, the invention relates to a method of data encryption, comprising: storing data, a first prime number (P), a second prime number (G), a third prime number (C), a first private prime number (Ps), a first random number (M), and a second random number (R), within an electronic memory storage device; calculating a sender public number (PUBs) with a processing element according to an equation $PUB_s = G^{Ps} \mod P$, using the first private prime number (Ps), the first prime number (P), and the second prime number (G); providing the sender public number (PUBs) to a recipient apparatus having knowledge of the first prime number (P), the second prime number (G), and the third prime number (C); encrypting the stored data with the processing element using encryption logic and a randomly generated key, where the randomly generated key is determined with elliptical curve cryptography (ECC); deleting the randomly generated key from the processing element after encryption of the data; calculating a common shared secret (S) with the processing element using the first prime number (P), the first private prime number (Ps), a recipient public number (PUBr), and the second random number (R); calculating a plurality of parameters with the processing element using a key equation based on the randomly generated key and the first random number (M), where the first parameter (Y1) is calculated using the third prime number (C) in the key equation, and where the second parameter (Y2) is calculated using the common shared secret (S) in the key equation; transmitting the encrypted data, the second random number (R), and the plurality of parameters (Y1,Y2) to a recipient apparatus; calculating the common shared secret (S) with the recipient apparatus in accordance with a second shared secret equation using the first prime number (P), a recipient private prime number (Pr), the sender public number (PUBs), and the second random number (R); calculating the randomly generated key with the recipient apparatus using the common shared secret(S), the third prime number (C), the plurality of parameters (Y1,Y2) and the simultaneous equations, where the randomly generated key is determined with elliptical curve cryptography (ECC); and decrypting the encrypted data with the recipient apparatus using encryption logic and a randomly generated key.

Other aspects and advantages of the invention will be apparent from the following description and the appended claims.

BRIEF DESCRIPTION OF DRAWINGS

It should be noted that identical features in different drawings are shown with the same reference numeral. The disclosure can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

The present disclosure generally pertains to data encryption systems and methods. A system in accordance with one exemplary embodiment of the present disclosure includes encryption logic that may be used by a sender to encrypt data to be sent to a recipient. In particular, the encryption logic randomly generates various numbers, including a key that is used to encrypt the data according to any known encryption scheme, such as data encryption standard (DES), advanced encryption standard (AES), or pretty good privacy (PGP), for example. The encryption logic uses the key to encrypt data that is to be sent to the recipient.

Further, the encryption logic uses an equation, referred to herein as the "key equation," that defines a relationship between a plurality of parameters, including the key that is used to encrypt the data. At least one of the parameters is a shared secret between the sender and the recipient. Using the key and the shared secret, the encryption logic calculates a value for at least one of the parameters defined by the key equation.

The encryption logic transmits the encrypted data to the recipient. In addition to transmitting the encrypted data, the encryption logic also transmits a sufficient number of the calculated values to allow the recipient to calculate the key based on the key equation. However, to help prevent an unauthorized user from gaining access to the key, the encryption logic does not transmit the key to the recipient but rather destroys the key after it is used to encrypt the data and to calculate at least one of the values being sent to the recipient. Based on the key equation, the shared secret, and the values received from the sender, the recipient calculates the key and uses the calculated key to decrypt the data.

Figure 1:
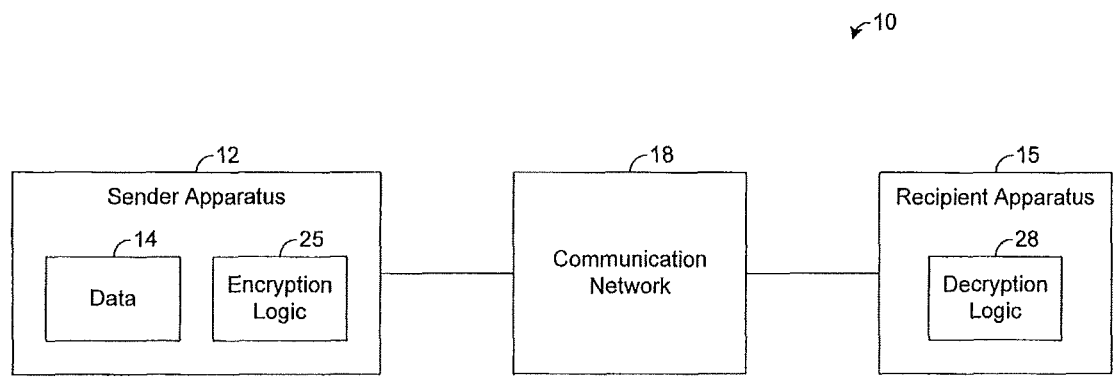
FIG. 1 is a block diagram illustrating an encryption system in accordance with an exemplary embodiment of the present disclosure.

Thus, the recipient is able to calculate the key without the key being communicated to the recipient. Further, by destroying the key, it is extremely difficult for a hacker to discover the key. In this regard, the key can be destroyed by the sender once it has been used to encrypt the data and to define at least one of the transmitted values, as described above. Further, when the recipient wishes to decrypt the data, the recipient can calculate the key based on the shared secret and transmitted values, use the calculated key to decrypt the data, and then destroy the key. Thus, the key is available at the equipment of the sender or recipient only for a short time making it very difficult for a hacker to find the key by hacking into such equipment:

FIG. 1 depicts a data encryption system 10 in accordance with an exemplary embodiment of the present disclosure. As shown by FIG. 1, the system 10 comprises a sender apparatus 12, such as a desk-top or lap-top computer or a personal digital assistant (PDA), for example, that is configured to transmit data 14 to a recipient apparatus 15, such as a desk-top or lap-top computer or a personal digital assistant (PDA), for example. In the example shown by FIG. 1, the sender apparatus 12 is coupled to and communicates with the recipient apparatus 15 via a communication network 18, such as the publicly switched telephone network (PSTN), a cellular network, and/or the Internet, for example. In one exemplary embodiment, the network 18 is a wide area network (WAN), but the other types of networks are possible in other embodiments. hi addition, it is possible for the sender apparatus 12 to communicate with the recipient apparatus 15 directly (e.g., via wireless radio frequency (RF) signals) without the use of a network of any kind.

The sender apparatus 12 preferably comprises encryption logic 25 that encrypts the data 14 before sending it to the recipient apparatus 15, and the recipient apparatus 15 comprises decryption logic 28 that decrypts the data 14 after receiving it, in encrypted form, from the sender apparatus 12. Exemplary techniques for encrypting and decrypting the data 14 will be described in more detail hereafter. It should be noted that the encryption logic 25 and the decryption logic 28 can be implemented in software, hardware, or a combination thereof. In an exemplary embodiment illustrated in FIG. 2, the encryption logic 25 is implemented in software and stored in memory 32 of the sender apparatus 12. Further, in an exemplary embodiment illustrated in FIG. 3, the decryption logic 25 is implemented in software and stored in memory 35 of the recipient apparatus 15.

Note that the encryption logic 25 and the decryption logic 28, when implemented in software, can be stored and transported on any computer-readable medium for use by or in connection with an instruction execution device that can fetch and execute instructions. In the context of this document, a "computer-readable medium" can be any means that can contain, store, communicate, propagate, or transport a program for use by or in connection with the instruction execution device. The computer readable-medium can be, for example but not limited to, an electronic, magnetic, optical, electromagnetic,—infrared, or semiconductor device or propagation medium.

Figure 2:
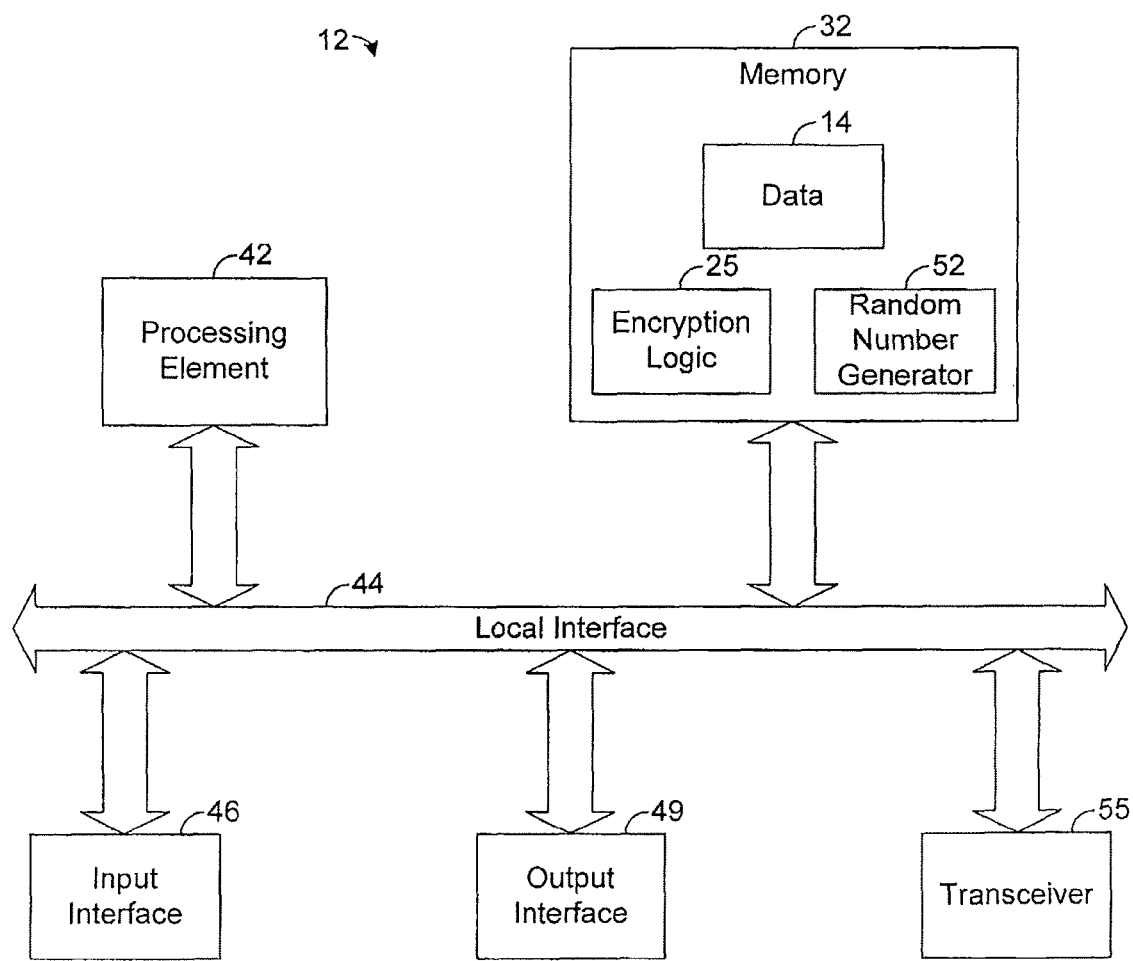
FIG. 2 is a block diagram illustrating a sender apparatus, such as is depicted in FIG. 1.

The exemplary embodiment of the sender apparatus 12 depicted by FIG. 2 comprises at least one conventional processing element 42, such as a digital signal processor (DSP) or a central processing unit (CPU), that communicates to and drives the other elements within the apparatus 12 via a local interface 44, which can include at least one bus. Furthermore, an input interface 46, for example, a keyboard or a mouse, can be used to input data from a user of the apparatus 12, and an output interface 49, for example, a printer or display device (e.g., a liquid crystal display or LCD), can be used to output data to the user. The sender apparatus 12 also comprises a random number generator 52 and a transceiver 55. The random number generator 52 is shown as being implemented in software, but the random number generator 52 may be implemented in hardware or a combination of software and hardware in other examples.

Figure 3:
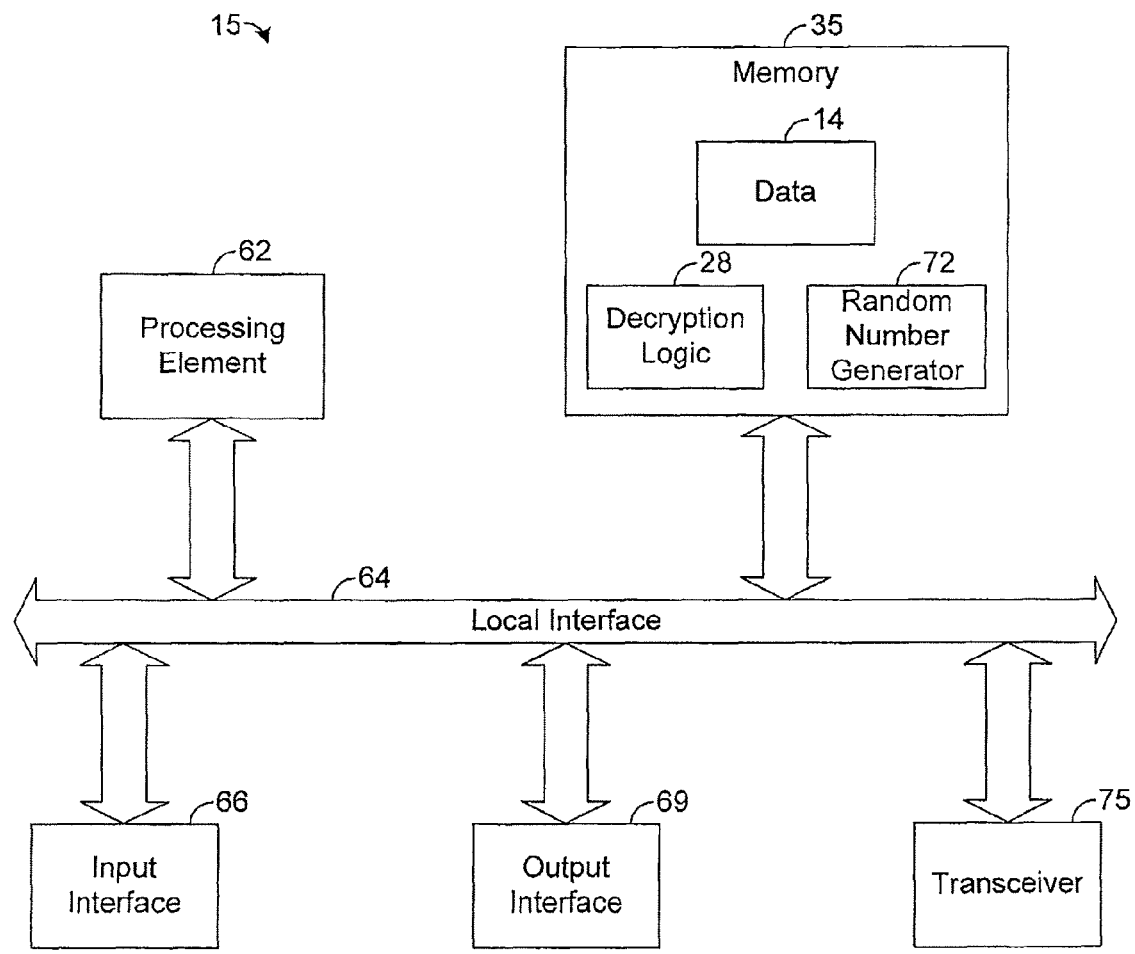
FIG. 3 is a block diagram illustrating a recipient apparatus, such as is depicted in FIG. 1.

The exemplary embodiment of the recipient apparatus 15 depicted by FIG. 3, like the sender apparatus 12, comprises at least one conventional processing element 62, such as a digital signal processor (DSP) or a central processing unit (CPU), that communicates to and drives the other elements within the apparatus 15 via a local interface 64, which can include at least one bus. Furthermore, an input interface 66, for example, a keyboard or a mouse, can be used to input data from a user of the apparatus 15, and an output interface 69, for example, a printer or display device (e.g., a liquid crystal display or LCD), can be used to output data to the user. The recipient apparatus 15 also comprises a random number generator 72 and a transceiver 75. The random number generator 72 is shown as being implemented in software, but the random number generator 72 may be implemented in hardware or a combination of software and hardware in other examples.

Initially, a set of prime numbers, referred to herein as "base numbers," is generated and shared between the sender apparatus 12 and the recipient apparatus 15. The base numbers may be generated or otherwise obtained by either apparatus 12 or 15, For illustrative purposes, assume that the base numbers are randomly generated by the random number generator 52 of the sender apparatus 12 and are transmitted to the recipient apparatus 15. As an example, the base numbers may be included in an email message and transmitted via transceiver 55 over the network 18 and received by the transceiver 75.

In one exemplary embodiment, three base numbers, P, G, and C, are randomly generated, and each of these numbers is 256 bits in length. However, other numbers of the base numbers and other bit lengths are possible in other embodiments.

The encryption logic 25 receives another randomly generated prime number, $P_s$, from the random number generator 52 and treats $P_s$ as a private secret. Thus, the encryption logic 25 does not share $P_s$ with the recipient apparatus 15. In one exemplary embodiment, the private number, $P_s$, like each of the base numbers, is 256 bits in length, but other bit lengths are possible in other embodiments. The encryption logic 25 combines the private number $P_s$ with the base numbers P and G to generate another number $Pub_s$, which is treated as a public number. In one embodiment, the foregoing numbers are combined according to the Diffie-Hellman equation. For example, $Pub_s$ may be calculated according to the equation, $Pub_s = G^{Ps}$ mod P. $Pub_s$ is preferably transmitted by the encryption logic 25, along with the base numbers, to the recipient apparatus 15. The decryption logic 28 stores the transmitted base numbers, P, G, and C, as well as $Pub_s$ in memory 35.

In addition, the decryption logic 28 receives a randomly generated prime number, $P_r$, from the random number generator 72 and treats $P_r$ as a private secret. Thus, the decryption logic 28 does not share $P_r$ with the sender apparatus 12. In one exemplary embodiment, the private number, $P_r$, like each of the base numbers, is 256 bits in length, but other bit lengths are possible in other embodiments. The decryption logic 28 combines the private number $P_r$ with the base numbers P and G to generate another number $Pub_r$, which is treated as a public number. In one embodiment, the foregoing numbers are combined according to the Diffie-Hellman equation. For example, $Pub_r$ may be calculated according to the equation, $Pub_r = G^{Pr}$ modP. $Pub_r$ is preferably transmitted by the decryption logic 28 to the sender apparatus 12. The encryption logic 25 stores Pub, in memory 32.

The encryption logic 25 receives three additional random numbers, K, M, and R, from the random number generator 52. In one exemplary embodiment, each of these numbers is 256 bits, although other bit lengths are possible. In the exemplary embodiment being described herein, K is a random prime number. M is not necessarily a prime number or larger than K, but M is preferably the same number of bits as K. R is a random prime number that preferably has a value larger than both the value of K and the value of M.

The encryption logic 25 uses K as a key to encrypt the data 14 according to any desired encryption scheme, such as PGP, DES, or AES, for example. However, to protect the key, K, that is used to encrypt the data 14, the encryption logic 25 does not share K with any other entity, even the decryption logic 28. Instead, the encryption logic 25 provides the decryption logic 28 with sufficient parameters to enable the logic 28 to calculate K according to a predefined algorithm, as will be described in more detail hereafter.

In this regard, the encryption logic 25 utilizes a predefined equation, also known by the decryption logic 28, to generate the parameters that are provided to the decryption logic 28 for enabling this logic 28 to calculate the key, K. In the instant example, the encryption logic 25 uses the following equation, referred to herein as the "key equation":

$$y = Mx + K \qquad \text{Equation (1).}$$

Both K and M are known by the encryption logic 25 but not the decryption logic 28. Note that other equations may be used as the key equation in other embodiments.

In the instant example, the encryption logic 25 is configured to use K to calculate values for at least one of the parameters in the key equation and to provide the calculated parameter to the decryption logic 28 to enable this logic 28 to calculate K based on the key equation, which is known by the logic 28. As described hereinabove, K is not communicated to the recipient apparatus 15 in order to keep K from being transmitted in the clear. In addition, in the instant example, another parameter, M, of the key equation is not transmitted to the recipient apparatus 15 to help obfuscate the key equation from any hacker who may be intercepting the values being transmitted to the recipient apparatus 15. Moreover, using M, K, and substituting a shared value for x in the key equation, the encryption logic 25 calculates y and transmits y to the recipient apparatus 15. In the instant example, the shared value substituted for x is C, which is one of the base numbers shared with the recipient apparatus 15, as described above. Thus, the calculated y value, which will be referred to hereafter as "$y_1$," can be expressed as follows:

$$Y_1 = MC + K \qquad \text{Equation (2).}$$

However, since there are two unknowns (M and K) in the key equation for the decryption logic 28, the logic 28 does not yet have sufficient information for calculating K. Thus, the encryption logic 25 calculates y for another instance of x, and provides this newly calculated 'y value to the recipient apparatus 15. To obfuscate the algorithm that is used to calculate K, the value selected for x in this calculation is preferably a shared secret, S, which will be described in more detail hereafter. Thus, the encryption logic 25 substitutes S for x in the key equation and calculates y. The logic 25 then transmits y to the recipient apparatus 15. This calculated y value, which will be referred to hereafter as "y²" can be expressed as follows:

$$Y_2 = MS + K \qquad \text{Equation (3)}.$$

Assuming that the shared secret, S, is known by the decryption logic 28, the decryption logic 28 now has sufficient information for calculating K. In this regard, in Equations 2 and 3, the decryption logic 28 is aware of all of the parameters except for M and K. Since there are two equations and two unknowns (M and K), the decryption logic 28 can solve the two equations for M and K. The decryption logic 28 may then use K as the key to decrypt the encrypted data 14 received from the sender apparatus 12.

To help obfuscate the encryption scheme, the shared secret is preferably based on private numbers that are not communicated between the sender apparatus 12 and the recipient apparatus 15. In the instant example, the private numbers used to calculate the shared secret S are $P_s$ and $P_r$. In this regard, the encryption logic 25 calculates S according to the following equation:

$$S = \text{hash}[(\text{Pub}_r^{P_s} \bmod P) + R] \qquad \text{Equation (4)}.$$

The "hash" refers to a hashing function that is applied to the value within the brackets [ ]. Thus, the shared secret S is equal to the result of a hashing function that is performed on Pub, raised to the power of $P_s$ multiplied by the modulo of P plus R. As described above, $\text{Pub}_r$, $P_s$, P, and R are all known by the encryption logic 25. In one exemplary embodiment, the hashing function "hash" is a Shaw 256 hashing function, although other hashing algorithms may be used in other embodiments. Note that the value Pub, raised to the power of $P_s$ times the modulo of P refers to the Diffie-Heilman number for Pubr, Ps, and P, treating $P_s$ as a private secret. Concatenating R, as well as taking a hashing function of the expression, helps to obfuscate the relationship between Pub, $P_s$, and P, and the hash function also reduces the bit length of S helping to facilitate the calculations set forth herein. Moreover, according to Diffie-Hellman principles, the following expression is true:

$$\text{Pub}_r^{P_s} \bmod P = p_r^{\text{Pubs}} \bmod P \qquad \text{Equation (5)}.$$

Thus, the decryption logic 28, without being provided P, can calculate the shared secret S according to the following equation:

$$S = \text{hash}[(P_r^{\text{Pubs}} \bmod P) + R] \qquad \text{Equation (6)}.$$

The "hash" refers to a hashing function that is applied to the value within the brackets [ ]. Thus, the shared secret S is equal to the result of a hashing function that is performed on $P_r$ raised to the power of $\text{Pub}_s$ multiplied by the modulo of P plus R. The hashing function is preferably the same one applied by the encryption logic 25 in calculating S, as described above. Further, the encryption logic 25 preferably shares R with the decryption logic 28 by transmitting R to the recipient apparatus 15. Knowing yi, y2, R, and S, the decryption logic 28 can calculate M and K and then use K to decrypt the data 14. Therefore, based on the values exchanged between the recipient apparatus 15 and the sender apparatus 12, as well as the shared secret S, which is calculable by both the encryption logic 25 and decryption logic 28, the decryption logic 28 is able to calculate the key, K, without K being communicated from the sender apparatus 12 to the recipient apparatus 15. Further, in calculating the shared secret, S, both the encryption logic 25 and the decryption logic 28 use a private number thereby enhancing the security of the encryption scheme.

In addition, after encrypting the data 14 with the key K and calculating $y_1$ and $y_2$; the encryption logic 25 preferably deletes K. In such a case, the key, K, would no longer exist until the decryption logic 28 later calculated it for decrypting the data 14. Accordingly, during this time, a hacker could not find the key by simply hacking into either the sender apparatus 12 or the recipient apparatus 15 and locating the key. The hacker could feasibly discover various numbers, such as $y_1$, $y_2$, and R, that are used to calculate the key. However, to use these numbers to decrypt the data 14 without finding the key, K, the hacker would first need to determine how the system 10, uses such numbers to calculate K or, in other words, break the scheme that is use no protect the key. Accordingly, the encryption techniques described herein address and protect against the vulnerability of a hacker attempting to locate a key that could be used to decrypt data. Indeed, once the decryption logic 28 decrypts the data 14, the logic 28 can similarly delete the key, K. Thus, the key, K, could be in existence only for a very short duration at either apparatus 12 or 15, making it extremely difficult for a hacker to find the key.

It should be noted that the above-described encryption techniques may be used to encrypt each message communicated between the sender apparatus 12 and the recipient apparatus 15. If desired, the base numbers, P, G, and C, may be communicated once. Thereafter, new values of K, M, and R, may be generated for each message or alternatively may be periodically updated. Many variations of the techniques described herein would be readily apparent to one of ordinary skill in the art upon reading this disclosure.

As described above, different types of equations may be used for the key equation. Further, different types of equations may produce different numbers of unknowns for the decryption logic 28. In this regard, in the exemplary embodiment described above, the key equation included two unknowns (M and K) for the decryption logic 28, and at least two instances of the key equation are, therefore, evaluated in order to provide the logic 28 with sufficient information for calculating K. In other examples, the key equation may have other numbers of unknowns for the logic 28. In such examples, other numbers of instances of the key equation may need to be evaluated in order to provide the logic 28 with sufficient information for calculating K.

Figure 4:
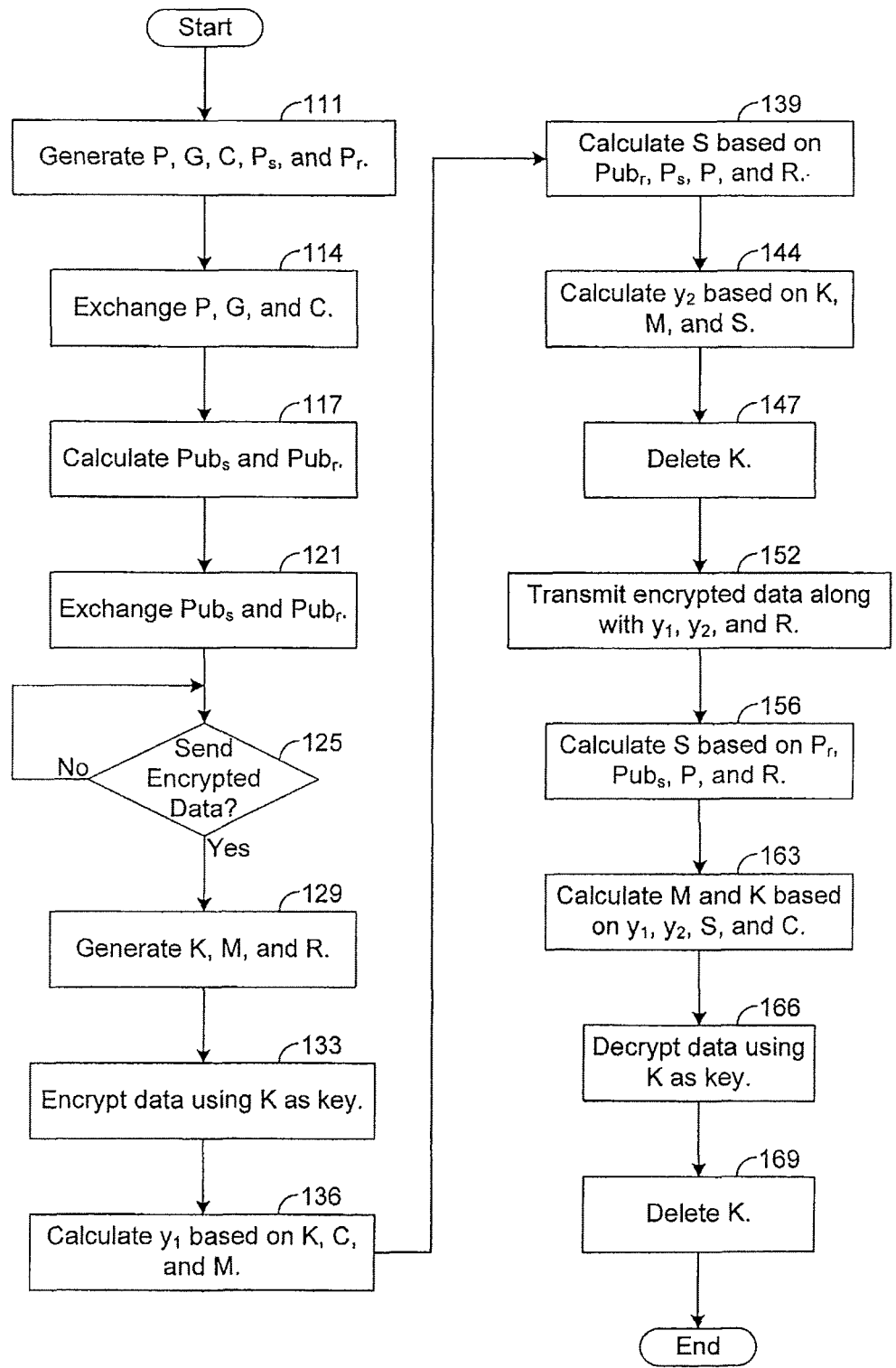
FIG. 4 is a flow chart illustrating an exemplary methodology for encrypting data in accordance with an exemplary embodiment of the present disclosure.

An exemplary use and operation of the encryption system 10 will be described below with reference to FIG. 4. Initially, the values of P, G, C, $P_s$, and $P_r$ are randomly generated, as indicated by block 111 of FIG. 4. In this regard, the encryption logic 25 requests four randomly generated numbers from the random number generator 52, which provides the logic 25 with the base numbers, P, G, and C, as well as the sender's private number Ps, which is private to the encryption logic 25. In addition, the decryption logic 28 requests a randomly generated number from the random number generator 72, which provides the logic 28 with $P_r$, which is private to the decryption logic 28. As indicated by block 114, the base numbers, P, G, and C, are exchanged. In this regard, the encryption logic 25 transmits P, G, and C to the recipient apparatus 15, and the decryption logic 28 stores P, G, and C in memory 35.

In addition, the public numbers $\text{Pub}_s$ and Pub, are calculated based on P and G, as indicated by block 117. In this regard, the encryption logic 25 combines $P_s$, P, and G to generate $\text{Pub}_s$, and the decryption logic 28 combines $P_r$, P, and G to generate Pub, Pubs and Pub, are exchanged; as indicated by block 121. In this regard, the encryption logic 25 transmits Pub, to the recipient apparatus 15, and the decryption logic 28 stores Pub, in memory 35. In addition, the decryption logic 28 transmits Pub, to the sender apparatus 12, and the encryption logic 25 stores Pub, in memory 32. Thus, at this point, the encryption logic 25 and the decryption logic 28 are both aware of P, G, C, $Pub_s$, and Pub. Further, $P_s$ is a private number known only by the encryption logic 25, and $P_r$ is a private number known only by the decryption logic 28.

In block 125, the encryption logic 25 determines whether encrypted data is to be transmitted to the recipient apparatus 15. As an example, a user of the apparatus 12 may submit an input requesting that an email message, or other type of message, to be encrypted and sent to the recipient apparatus 15. In response, the logic 25 makes a "yes" determination in block 125.

As indicated by block 129, K, M, and R are generated. In this regard, the encryption logic 25 requests three randomly generated numbers from the random number generator 52, which provides the logic 25 with K, M, and R. The encryption logic 25 uses K as a key to encrypt the data 14 that is being transmitted to the recipient apparatus 15, as indicated by block 133. In addition, the encryption logic 25 calculates $y_i$ based on Equation 2 and the known values of K, C, and M, as indicated by block 136. The encryption logic 25 also calculates the shared secret, S, based on Equation 4 and the known values of Pub, $P_s$, P, and R, as indicated by block 139. The encryption logic 25 further calculates y2 based on Equation 3 and the known values of K, M, and S, as indicated by block 144. After encrypting the data 14 with K and using K to calculate y1 and y2, the encryption logic 25 deletes K, as indicated by block 147. Thus, at this point, K no longer exists within the system 10.

As indicated by block 152, the encryption logic 25 transmits the encrypted data 14, as well as $y_1$, $y_2$, and R, to the recipient apparatus 15. As an example, if the encrypted data 14 defines a textual portion of an email message, the values of $y_1$, $y_2$, and R may be attached to the same email message that includes the encrypted data 14.

After the apparatus 15 receives the encrypted data 14, as well as $y_1$ $y_2$, and R, the decryption logic 28 calculates the shared secret, S, based on Equation 6 and the known values of $P_r$, $Pub_s$, P, and R, as indicated by block 156. Then, the decryption logic 28 calculates M and K based on Equations 2 and 3 and the known values of $y_2$, S, and C, as indicated by block 163. Having now calculated the key, K, the decryption logic 28 decrypts the data 14, as indicated by block 166. At this point, K is no longer needed, and the logic 28 deletes K, as indicated by block 169. Note that if another message is to be communicated between the sender apparatus 12 and the recipient apparatus 15, the same method shown by FIG. 4 may be used to transmit the message in either direction. However, if the same values of P, G, C, Ps, Pr, Pubs, and Pub, are to be used, then the process may begin, at block 129 for future messages.

Moreover, as can be seen by the foregoing example, the key that it is used to encrypt the data 14 may be deleted shortly after encryption. Further, prior to deleting the key, the sender apparatus 12 may then calculate various numbers based on the key equation and then provide these numbers to the recipient apparatus 15, which may use the numbers to calculate the key. Thus, it is unnecessary for the key to be stored in either apparatus 12 or 15 except during the short duration that the key is actually being used (1) by the logic 25 to encrypt the data 14 or calculate the numbers from the key equation or (2) by the logic 28 to decrypt the data 14. Accordingly, even if a hacker hacks into and gains access to either apparatus 12 or 15, it is unlikely that the hacker would be able to find the key, K.

In an alternative embodiment, the present invention may utilize "elliptical curve cryptography (ECC)" in conjunction with the encryption method. The ECC method has the advantage of being less computationally burdensome and therefore faster than other encryption methods. The primary benefit of ECC is a smaller key size that reduces storage and transmission requirements. In other words, an elliptic curve group can provide the same level of security afforded by an RSA-based system with a large modulus and correspondingly larger key. For example, a 256-bit ECC public key may provide comparable security to a 3072-bit RSA public key.

ECC is an approach to public-key cryptography based on the algebraic structure of elliptic curves over finite fields. One of the main benefits of ECC cryptography is that it provides the same level of security while using keys of smaller size. Public-key cryptography is based on the intractability of certain mathematical problems. Early public-key systems are secure assuming that it is difficult to factor a large integer composed of two or more large prime factors. For elliptic-curve-based protocols, it is assumed that finding the discrete logarithm of a random elliptic curve element with respect to a publicly known base point is infeasible. This is called the "elliptic curve discrete logarithm problem" (ECDLP). The entire security of ECC depends on the ability to compute a point multiplication and the inability to compute the multiplicand given the original and product points. The size of the elliptic curve determines the difficulty of the problem.

To use ECC all parties must agree on all the elements defining the elliptic curve, called the "domain parameters" of the scheme. Unless there is an assurance that domain parameters were generated by a party trusted with respect to their use, the domain parameters should be validated before use. The generation of domain parameters is not usually done in some embodiments by each participant since this involves computing the number of points on a curve which is time-consuming and troublesome to implement. As a result several standard bodies published domain parameters of elliptic curves for several common field sizes. Such domain parameters are commonly known as "standard curves" or "named curves". A named curve can be referenced either by name or by the unique object identifier defined in the standard documents.

Since all the fastest known algorithms that solve the ECDLP need $O(\sqrt{n})$ steps, it follows that the size of the underlying field should be roughly twice the security parameter. For example, for 128-bit security is used for a curve over $\mathbb{F}_q$, where $q \approx 2^{256}$. In contrast, a finite-field cryptography (e.g., DSA) requires 3072-bit public keys and 256-bit private keys, and integer factorization cryptography (e.g., RSA) which requires a 3072-bit value of n, where the private key should be just as large. However the public key may be smaller in alternative embodiments to accommodate efficient encryption, especially when processing power is limited.

One embodiment of the present invention utilizes a "Secure Random Key (SRK)" encryption application that is a symmetric encryption key agreement and management technology that reduces the vulnerabilities associated with industry standard key management techniques. Once SRK is implemented into a software application or hardware device, SRK can be relied upon to secure communications between devices, encrypt data at rest or in motion, and provide efficient access controls to not only single devices but groups of devices via an encrypted broadcast capability. The SRK process is a unique key management and symmetrical encryption methodology in that the actual crypto key used is never transmitted between the two devices, but instead generated and regenerated on the fly at each of the end points in a secure data transmission. It should also be noted that the crypto key is never stored longer than what is required by the application to encrypt and decrypt the data.

FIG. 1 depicts the most common SRK deployment scenario. User A and user B require a secure and encrypted method for transmitting data between one another via a common application. This common application implements SRK to meet the users requirement. The SRK is capable of creating new randomly generated keys on the fly to encrypt and decrypt data with little to no overhead. These randomly generated keys are never stored or transmitted, but instead immediately destroyed after being used. This prevents any and all exposure of the most important component of an encryption key agreement and management encryption implementation, the key.

The SRK applications implementation of symmetric encryption key agreement and management technology provides multiple technology features including the following:

Random Key Generation:

SRK generates a new and different random key every time data needs to be encrypted. During data transmission this key is never transmitted and the data receiver regenerates the key to decrypt the data. This prevents the encryption key from ever being exposed during data transmissions.

Maximum Encryption Strength:

SRK does not require a secure exchange of protected keys using an asymmetrical encryption key exchange process and without this requirement SRK can immediately and securely implement a symmetric encryption process with large bit key lengths. These large bit key lengths are not possible to implement in a production environment using asymmetric encryption key exchanges due to processing overhead.

Efficient Broadcast/Multicast Encryption:

SRK can efficiently broadcast encrypted data to multiple selected recipients simultaneously.

No Certificates:

SRK is not reliant on certificates reducing cost and administrative overhead that is typically associated with managing and protecting certificates.

Modular Design:

SRK key management not only allows any symmetric encryption algorithm to be used to provide the fastest, most efficient and most secure method for transmitting sensitive data, but also provides multiple methods to easily administer the environment. SRK can be managed in a peer-to-peer relationship or using a centralized management server/controller.

The installation phase installs the SRK technology onto an end point device for utilization. Within this phase several values are initially generated to include a set of three group identification numbers used for access controls, a unique device identification number, and a unique digital identification number of specified size. SRK relies upon "crypto library's" to perform crypto mathematical operations to securely generate these numbers.

Once the installation process has occurred on two or more devices is some embodiments, these devices need to carry out a one-time initialization process before they can communicate with one another. This initialization process can occur between individual devices in a peer-to-peer fashion or from an individual device to a central repository in a client-to-server fashion. During the initialization process unique and definable sized device digital identification numbers must be exchanged. A secured exchange process should be used to carry out this exchange.

Once both the installation and initialization processes have occurred SRK is ready to be utilized by an application to perform dynamic symmetric encryption key agreements and management. For an application to take advantage of the SRK technology, the application is required to manage a trust relationship between the SRK and the application itself.

In some embodiments, SRK is written in the C/C++ programming language, or other low level programming language that offers the most platform portability and compatibility options. The SRK application also uses core SRK "Dynamic Linked Library's" (DLLs) to create a standardized and publically accessible "Application Program Interface" (API) that can be used within SDK. Other embodiments may include other features by adding in authentication capabilities, digital signatures, and incorporating elliptical curve cryptography. These features may be integrated within the DLLs and exposed through a simplified API.

In one specific embodiment of a version of the SRK application, the following technologies are used:

Programming Languages: Delphi (Object Pascal);

Build Environment: Microsoft Visual Source Safe (Version control and revisions) and custom build scripts individually maintained;

Presentation: Shared Objects and Dynamic-Link Libraries;

Crypto Libraries: Crypto++, OpenSSL, Bouncy Castle, and Spongy Castle; and

Crypto Algorithms: AES (128 or 256), SHA1, SHA-256, FIPS approved pseudo-random number generator, Lagrange Polynomial Interpolation (LIPS) and Sharmir's Secret Sharing Scheme.

The embodiment of SRK uses the following security mechanisms:

Fully vetted and FIPS approved algorithms and libraries for all crypto functions;

EXECryptor version 2.3.9 to encrypt binary and project files; and

Run-time execution anti-tampering protections via built in power up self tests and validation routines.

This embodiment includes two separate DLL files. The first file is intended for private sector use of SRK and includes 18 publically defined functions that allow for API level access to the SRK's core functions. This DLL was compiled for utilization in a commercial release or in support of commercial applications implementing this application for symmetric encryption key agreement and management.

The following is a list of the functions that are exported from the commercial embodiment of the SRK that the application can call directly:

AES_EncryptHexStr—Encrypts a hex string and returns the result as a hex string;

AES_EncryptText—Encrypts a string and returns the result as a Base64 string;

AES_EncryptFile—Encrypts a file;

AES_EncryptStream—Encrypts a TStream Object;

AES_DecryptHexStr—Decrypts a hex string and returns the result as a hex string;

AES_DecryptText—Decrypts a Base64 encoded encrypted string;

AES_DecryptFile—Decrypts a file;

AES_DecryptStream—Decrypts a TStream Object;

PRNGx931—Generates a Random Number conforming to ANSI x9.31;
SHA1—Calculates the SHA-1 hash of a string and returns it as a hex string;
SHA256—Calculates the SHA-256 hash of a string and returns it as a hex string;
RSAVerify—Validates the RSA signature of a message;
Get_State—Returns a text string indicating the state of the DLL;
Get_State_Number—Returns an integer value indicating the state of the DLL;
Get_Version—Returns a string indicating the version of the DLL;
Init_GetMemoryFunc—Sets the optional callback routine for allocating memory;
StrToBase64—Encodes a string as a Base64 string (printable ASCII characters); and
Base64ToStr—Decodes a Base64 string and returns the original string.

The following is a list of the additional functions that are exported from the FIPS Certification version of the DLL that the application can call directly:
PV_Encr—Encrypts a hex string;
PV_Decr—Decrypts a hex string;
PV_RSAV—Validates an RSA signature;
PV_PRNG—Issues calls to the random number generator;
PV_SHA256—Generates the SHA-256 hash for a string; and
PV_SHA1—Generates the SHA-1 hash for a string.

The second DLL file is intended for government use and meets its own specific security requirements. This DLL file includes 19 publically defined functions that allow for API level access to the core functions. This DLL was compiled for utilization in a government release or in support of government applications implementing the application for symmetric encryption key agreement and management.

The following is a list of the functions that are exported from the production version of the DLL that the application can call directly:
AES_EncryptHexStr—Encrypts a hex string and returns the result as a hex string;
AES_EncryptText—Encrypts a string and returns the result as a Base64 string;
AES_EncryptFile—Encrypts a file;
AES_EncryptStream—Encrypts a TStream Object;
AES_DecryptHexStr—Decrypts a hex string and returns the result as a hex string;
AES_DecryptText—Decrypts a Base64 encoded encrypted string;
AES_DecryptFile—Decrypts a file;
AES_DecryptStream—Decrypts a TStream Object;
PRNGx931—Generates a Random Number conforming to ANSI x9.31;
SHA1—Calculates the SHA-1 hash of a string and returns it as a hex string;
SHA256—Calculates the SHA-256 hash of a string and returns it as a hex string;
RSAVerify—Validates the RSA signature of a message;
Get_State—Returns a text string indicating the state of the DLL;
Get_State_Number—Returns an integer value indicating the state of the DLL;
Get_Version—Returns a string indicating the version of the SRKCrypto DLL;
Init_GetMemoryFunc—Sets the optional callback routine for allocating memory;
StrToBase64—Encodes a string as a Base64 string (printable ASCII characters); and
Base64ToStr—Decodes a Base64 string and returns the original string.

The following is a list of the additional functions that are exported from the FIPS Certification version of the DLL that the application can call directly:
PV_Ener—Encrypts a hex string;
PV_Decr—Decrypts a hex string;
PV_RSAV—Validates an RSA signature;
PV_PRNG—Issues calls to the random number generator;
PV_SHA256—Generates the SHA-256 hash for a string; and
PV_SHA1—Generates the SHA-1 hash for a string.

This embodiment has multiple run-time execution anti-tampering protections and self-validation testing routines built in. These protections and self-validation routines ensure that core functions remain unmodified and are functioning correctly before allowing SRK to become fully functional.

When the DLL is loaded by an application, the DLL's main routine is invoked. When this occurs a notification is received and the main procedure initializes the objects and values required to provide the encryption related functions. It then calls the Initialize_RNG procedure to issue the first call to the random number generator so that it can save off the value for subsequent testing to ensure that identical numbers are never generated twice in a row. Once this has completed it then calls the CheckCert procedure to verify that the DLL's RSA Signature certificate signing is valid.

Next the PowerUpSelfTest procedure is called to perform the DLL's known answer tests to make sure that the encryption related routines are functioning properly. The PowerUpSelfTest procedure calls the following routines to perform the known answer tests:
Test_AES_Encrypt—verifies that encryption of specified plain text using a specified key & iv provide the expected cipher text;
Test_AES_Decrypt—verifies that decryption of specified cipher text using a specified key & iv provide the expected plain text;
Test_PRNG—verifies that calling the random number generator with specified values results in the expected result;
Test_SHA256—verifies that the SHA-256 hash of a specified text string returns the expected hash value;
Test_SHA1—verifies that the SHA-1 hash of a specified text string returns the expected hash value; and
Test_RSA—verifies that the RSA signature validation of a valid set of values passes.

If any of the above tests result in a failure then the DLL is put into the "Not Ready" state and all subsequent calls to the DLL result in an error except the Get_State and Get_State_Number functions which will return a message or number respectively indicating which test failed. The only way to get the DLL out of the error state is to exit the program and restart it.

If all of the tests in the PowerUpSeliTest are successful then the DLL is placed into the "Ready" state and the application can begin issuing calls to the DLL. If an internal error occurs at any time, then the DLL is and all subsequent calls to the DLL result in an error except the Get_State and Get_State_Number functions which will return a message or number respectively indicating which test failed. The only way to get the DLL out of the error state is to exit the program and restart it.

In another specific embodiment of a version of the SRK application, the following technologies are used:

Programming Languages: C++ and C#;
Presentation: Shared Objects and Dynamic-Link Libraries
Build Environment: Visual Studio 2010;
Crypto Libraries: Crypto++, Open SSL, Bouncy Castle, and Spongy Castle; and
Crypto Algorithms: AES (128 or 256), Elliptical Curve Diffie-Hellmen (ECDH), SHA-512, FIPS approved pseudo-random number generator, authenticated Diffie-Hellman including Fully Hashed Menezes-Qu-Vanstone (FHMQV), Lagrange Polynomial Interpolation (LIPS) and Sharmir's Secret Sharing Scheme.

The embodiment of SRK uses the following security mechanisms:

Code obfuscators and run-time execution anti-tampering protections;
Strictly limited API interface for interaction with SRK; and
FIPS approved algorithms and libraries for all crypto functions.

As with the prior embodiment, this embodiment includes two separate DLL files. The first file is intended for private sector use of SRK and includes 15 publically defined functions that allow for API level access to the SRK's core functions. This DLL was compiled for utilization in a commercial release or in support of commercial applications implementing this application for symmetric encryption key agreement and management.

The following is a list of the functions made available:
GenGUID—Returns a Global Unique Number;
GenGUID_Mobile—Returns a Global Unique Number for mobile environments;
GenKey—Returns a randomly generated number (FIPS 9.17) that can be used as an encryption key;
GenKey_Mobile—Returns a randomly generated number (FIPS 9.17) that can be used as an encryption key for mobile environments;
GenGroupIDs—Returns a set of three GroupIDs;
GenGroupIDs—Returns a set of three GroupIDs in a mobile environment;
GenPartNum—Returns a partnership number (Digital ID);
GenPartNum_Mobile—Returns a partnership number (Digital ID) in a mobile environment;
GenRefNum—Returns a set of three reference numbers;
GenRefNum_Mobile—Returns a set of three reference numbers in mobile environment;
ResRefNum—Returns a resolved encryption key from a set of reference numbers;
ResRefNum_Mobile—Returns a resolved encryption key from a set of reference numbers in mobile environment;
GetSRKStatus—Returns the status of SRK;
GetVersionNumber—Returns the version number of SRK; and
GetVersionString—Returns the version of SRK.

The second DLL file is intended for government use and meets its own specific security requirements. This DLL file includes 18 publically defined functions that allow for API level access to the core functions. This DLL was compiled for utilization in a government release or in support of government applications implementing the application for symmetric encryption key agreement and management.

The following is a list of the functions made available through the DLL:
GenGUID—Returns a Global Unique Number;
Gen_Key—Returns a randomly generated number (FIPS 9.17) that can be used as an encryption key;
GenECDHPair—Returns an elliptical curve Diffie-Hellman private and public set of values;
GenECDH2Pair—Returns as elliptical curve authenticated Diffie-Hellman private and public set of values;
GenECMQVPair—Returns an elliptical curve normal MQV Diffie-Hellman private and public set of values;
GenFHMQPair—Returns an elliptical curve fully hashed MQV Diffie-Hellman;
GenFHMQVAuth—Returns an elliptical curve authenticated fully hashed MQV Diffie-Hellman;
GenRN—Returns a set of three reference numbers;
GenRN2—Returns a set of three reference numbers digitally signed;
GenRNMQV—Returns a set of three reference numbers;
GenRNFHMQV—Returns a set of three reference numbers;
ResRN—Returns a resolved encryption key from a set of reference numbers;
ResRN2—Returns a set of digitally signed three reference numbers;
ResRNMQV—Uses the three reference numbers to generate a key once the sender has been authenticated using the MQV process;
ResRNFHMQV—Uses the three reference numbers to generate a key once the sender has been authenticated using the fully hashed MQV process;
GetSRKStatus—Returns the status of SRK;
GetVersionNumber—Returns the version number of SRK; and
GetVersionString—Returns the version of SRK.

This embodiment of SRK introduces an authentication protocol that allows developers to establish a verified connection between communicating parties. This authentication protocol adds to the ability to perform authorization validation prior to performing the core operations. Authentication is performed using the Menezes-Qu-Venstone (MQV) protocol, which is based off the Diffie-Hellman scheme.

As depicted in the exemplary embodiments, the present invention may be implemented by a computer system to process the information and data gathered during the process. The volume of information processed, combined with the speed at which the information must be processed, makes the use of a computer advantageous. The computer system will typically have a processor, such as central processing unit (CPU), where the processor is linked to a memory, an input, and an output. A modeling computer may include several other components as well. For example, the memory components may include a hard disc for non-transitory storage of information, as well as random access memory (RAM). The input components may include a keyboard, a touchscreen, a mouse, and a modem for electronic communication with other devices. The output components may include a modem, which may be the same modem used for the input or a different one, as well as a monitor or speakers. Many of the different components may have varying physical locations, but they are still considered a computer for purposes of this description. For example, the memory may be on a hard drive in the same physical device as the processor, or the memory component may be remotely located and accessed as needed using the input and output. The memory may also have one more programs to carry out the functions described previously. The memory components may also have one more databases along with related data.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A method of data encryption, comprising:
   a. storing data, a first prime number (P), a second prime number (G), a third prime number (C), a first private prime number (Ps), a first random number (M), and a second random number (R), within an electronic memory storage device;
   b. calculating a sender public number (PUBs) with a processing element according to an equation $PUB_s = G^{Ps}$ mod P, using the first private prime number (Ps), the first prime number (P), and the second prime number (G);
   c. providing the sender public number (PUBs) to a recipient apparatus having knowledge of the first prime number (P), the second prime number (G), and the third prime number (C);
   d. encrypting the stored data with the processing element using encryption logic and a randomly generated key, where the randomly generated key is determined with elliptical curve cryptography (ECC);
   e. deleting the randomly generated key from the processing element after encryption of the data;
   f. calculating a common shared secret (S) with the processing element using the first prime number (P), the first private prime number (Ps), a recipient public number (PUBr), and the second random number (R);
   g. calculating a plurality of parameters with the processing element using a key equation based on the randomly generated key and the first random number (M),
      i. where the first parameter (Y1) is calculated using the third prime number (C) in the key equation, and
      ii. where the second parameter (Y2) is calculated using the common shared secret (S) in the key equation;
   h. transmitting the encrypted data, the second random number (R), and the plurality of parameters (Y1,Y2) to a recipient apparatus;
   i. calculating the common shared secret (S) with the recipient apparatus in accordance with a second shared secret equation using the first prime number (P), a recipient private prime number (Pr), the sender public number (PUBs), and the second random number (R);
   j. calculating the randomly generated key with the recipient apparatus using the common shared secret(S), the third prime number (C), the plurality of parameters (Y1,Y2) and the simultaneous equations, where the randomly generated key is determined with elliptical curve cryptography (ECC); and
   k. decrypting the encrypted data with the recipient apparatus using encryption logic and a randomly generated key.

2. The method of claim 1, where the sender public number (PUBs) is equal to a dividend modulo a divisor, wherein the dividend is the second prime number (G) raised to the power of the first private prime number (Ps) and the divisor is the first prime number (P).

3. The method of claim 1, where the first one of the plurality of parameters (Y1) is equal to the randomly generated key plus the second random number (M) multiplied by the third prime number (C).

4. The method of claim 1, where the second one of the plurality of parameters (Y2) is equal to the randomly generated key plus the second random number (M) multiplied by the common shared secret (S).

* * * * *